No. 751,623. PATENTED FEB. 9, 1904.
C. W. FARR.
SOUNDING APPARATUS.
APPLICATION FILED NOV. 9, 1903.
NO MODEL.
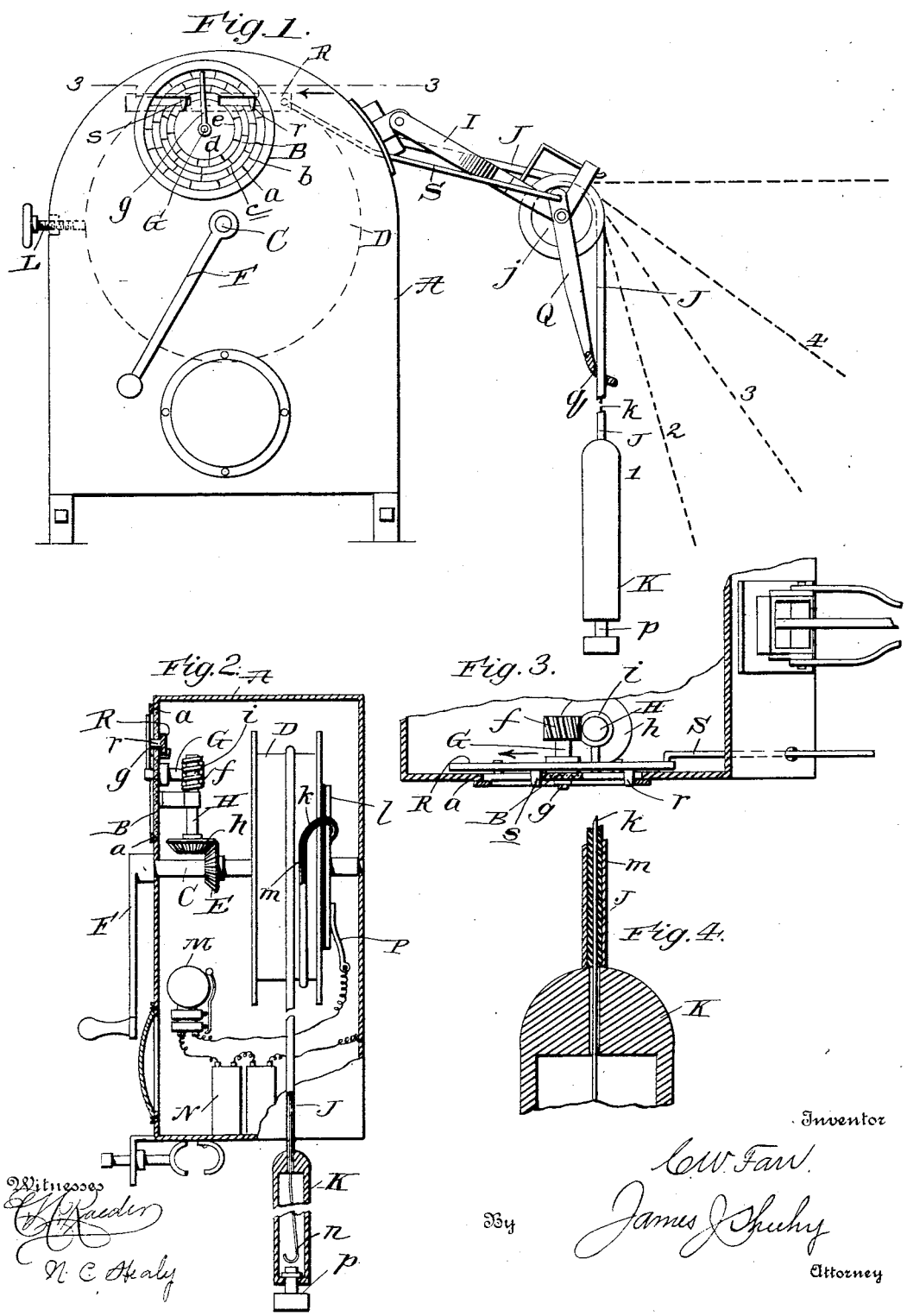

No. 751,623. Patented February 9, 1904.

UNITED STATES PATENT OFFICE.

CHARLES WARREN FARR, OF CHICAGO, ILLINOIS.

SOUNDING APPARATUS.

SPECIFICATION forming part of Letters Patent No. 751,623, dated February 9, 1904.

Application filed November 9, 1903. Serial No. 180,400. (No model.)

*To all whom it may concern:*

Be it known that I, CHARLES WARREN FARR, a citizen of the United States, residing at Chicago, in the county of Cook and State of Illinois, have invented new and useful Improvements in Sounding Apparatus, of which the following is a specification.

My invention pertains to sounding apparatus or bathometers; and it has for its object to provide a sounding apparatus through the medium of which the depth of water may be readily ascertained irrespective of the speed or direction of movement of a vessel and also when the vessel is moored or at anchor.

The invention will be fully understood from the following description and claims when taken in connection with the accompanying drawings, forming part of this specification, in which—

Figure 1 is a side elevation, partly in section, of the apparatus constituting the preferred embodiment of my invention; Fig. 2, a vertical section taken through the casing of the apparatus and illustrating the sinker-section; Fig. 3, an enlarged detail section taken in the plane indicated by the line 3 3 of Fig. 1, and Fig. 4 an enlarged broken section illustrative of portions of the sinker and cable.

Similar characters designate corresponding parts in all of the several views of the drawings, referring to which—

A is the case of my novel apparatus, which is preferably of metal and is designed to be clamped or otherwise secured on the rail of a ship, and B is a transparent dial secured to one of the side walls of the case and exposed through an opening $a$ therein. The said dial is provided with a plurality of, preferably four, circular graduated scales $b$, $c$, $d$, and $e$ for a purpose hereinafter set forth.

C is a transverse shaft journaled in the side walls of the case and bearing a drum D, a miter-gear E, and a crank F; G, a shaft journaled in the center of the dial B and in a suitable bearing within the case and carrying a worm-wheel $f$ and a pointer $g$; H, a shaft mounted within the case and bearing a miter-gear $h$, intermeshed with the gear E, and a worm $i$, intermeshed with the worm-wheel $f$; I, a bracket-arm connected to and resting outside the casing and carrying a sheave $j$; J, a cable connected at one end to and wound on the drum and extending therefrom through an opening in the casing and over the sheave $j$; K, a sinker connected to the cable, and L a brake-bearing in the case and having for its purpose to hold the drum against rotation. In virtue of this construction it will be observed that when the brake is taken off the drum and the drum is rotated, through the medium of the crank F or any other means that may be employed for the purpose, the pointer $g$, which is disposed in front of the dial B, will also be rotated to indicate in fathoms the amount of cable paid off the drum.

The cable I comprises a copper wire $k$, covered with insulation and electrically connected with a conductive plate $l$, carried by but insulated from the drum D, and an armor $m$, of galvanized-iron wire or other suitable material, electrically connected with the drum. At its outer end the copper wire $k$ terminates in a spring-piece $n$, disposed in but insulated from the sinker K and arranged to be engaged by a movable rod $p$, which normally protrudes through the lower end of the sinker when said rod strikes the bottom.

M is an electric bell disposed in the case A and electrically connected with one pole of a galvanic battery N, the other pole of which is electrically connected with the case A, and P is a shoe bearing against the plate $l$ and electrically connected with the electric bell. Now when it is understood that the armor $m$ of cable J is electrically connected with the sinker K it will be observed that when the sinker strikes the bottom and the push-rod $p$ contacts with the spring-piece $n$ the electric circuit will be closed, and the current will pass from one pole of the battery N to and through the case A, drum D, cable-armor $m$, sinker K, push-rod $p$, spring-piece $n$, cable-core $k$, plate $l$, and shoe P, and to and through the electric bell to the other pole of the battery, thereby ringing the bell and apprising the operator of the fact that the sinker is on the bottom.

Q is a lever fulcrumed at an intermediate point of its length on the bracket-arm I and having an eye $q$ in its lower arm receiving the cable J, and R is a rectilinearly-movable bar arranged in a guide on the back of the dial B and bearing pointers $r$ $s$, preferably colored in contrast to the dial. The said bar R is connected by a rod S with the upper arm of the lever Q, and from this it follows that when the vessel bearing the apparatus is moving forwardly the bar will be moved in the direction indicated by arrow in proportion to the angle which the cable J assumes because of the speed of the vessel. For instance, when the cable occupies the position numbered 1, as when the vessel is at anchor, the pointer $r$ will rest opposite the circular scale $b$. When the cable assumes angle 2, the pointer $r$ will rest opposite scale $c$. When the cable assumes angle 3, the pointer $r$ will rest opposite scale $d$, and when the cable assumes angle 4 the pointer $r$ will rest opposite scale $e$. The pointer $r$ indicates the scale to be read, and consequently it will be seen that irrespective of the speed at which the vessel is moving forwardly the attendant is enabled when the sinker strikes the bottom and the bell rings to readily ascertain the depth in fathoms of the water. When the vessel is moving rearwardly, the pointer $s$ operates in the same manner and for the same purpose as the pointer $r$ in respect to forward movement of the vessel.

Notwithstanding the practical advantages of my novel sounding apparatus or bathometer, as pointed out in the foregoing, it will be noticed that the apparatus is simple and inexpensive in construction, also that it embodies no delicate parts such as are liable to get out of order after a short period of use, and hence is enabled to withstand the usage to which such apparatus is ordinarily subjected on shipboard.

I have entered into a detailed description of the construction and relative arrangement of the parts embraced in the present and preferred embodiment of my invention in order to impart a full, clear, and exact understanding of the same. I do not desire, however, to be understood as confining myself to such specific construction and relative arrangement of parts, as such changes or modifications may be made in practice as fairly fall within the scope of my invention as claimed.

Having described my invention, what I claim, and desire to secure by Letters Patent, is—

1. In a sounding apparatus, the combination of a drum, a cable thereon, a sinker carried by the cable, means for giving notice when the sinker strikes the bottom, a dial provided with a plurality of graduated scales, a pointer, a connection between the drum and the pointer for moving the latter by the former, and means controlled by the position of the cable for indicating the graduated scale to be read in connection with the pointer.

2. In a sounding apparatus, the combination of a drum, a cable thereon, a sinker carried by the cable, means for giving notice when the sinker strikes the bottom, a dial provided with a plurality of graduated scales, a pointer, a connection between the drum and the pointer for moving the latter by the former, a lever receiving the cable, and a pointer connected with the lever so as to be moved thereby, and arranged to indicate the graduated scale to be read in connection with the first-mentioned pointer.

3. In a sounding apparatus, the combination of a cable provided with a sinker, a dial provided with a plurality of graduated scales, a pointer, means intermediate of the cable and the pointer for moving the latter by the former, and means controlled by the position of the cable for indicating the graduated scale to be read in connection with the pointer.

4. In a sounding apparatus, the combination of a drum, a cable thereon, a sinker carried by the cable, means for giving notice when the sinker strikes the bottom, a dial provided with a plurality of concentric, circular graduated scales, a rotary pointer having its center of movement within the scales, a connection between the drum and the pointer for rotating the latter by the former, and means controlled by the position of the cable for indicating the graduated scale to be read in connection with the pointer.

5. In a sounding apparatus, the combination of a drum, a cable thereon, a sinker carried by the cable, means for giving notice when the sinker strikes the bottom, a dial provided with a plurality of concentric, circular graduated scales, a rotary pointer having its center of movement within the scales, a connection between the drum and the pointer for rotating the latter by the former, a lever receiving the cable, and a rectilinearly-movable pointer connected and movable with the lever for indicating the circular scale to be read in connection with the rotary pointer.

6. In a sounding apparatus, the combination of a cable provided with a sinker, a dial provided with a plurality of graduated scales, a pointer, means intermediate of the cable and the pointer for moving the latter by the former, and pointers controlled by the position of the cable for indicating the graduated scale to be read in connection with the first-mentioned pointer; one of the last-mentioned pointers being for use when a ship is moving forwardly, and the other for use when the ship is moving rearwardly.

7. In a sounding apparatus, the combination of a case, a drum, a cable thereon, a sinker carried by the cable, an electric bell in the case, means for ringing said bell when the sinker strikes the bottom, a sheave on an arm of the case over which the cable passes, a lever fulcrumed on said arm, and having an eye in one of its arms receiving the cable, a dial bearing a plurality of concentric, circular graduated scales, a rotary pointer, a connection between the drum and the pointer for rotating the latter by the former, and a rectilinearly-movable bar arranged in a guide on the dial, and connected with the lever; said bar bearing a pointer for indicating the graduated scale to be read in connection with the pointer.

In testimony whereof I have hereunto set my hand in presence of two subscribing witnesses.

CHARLES WARREN FARR.

Witnesses:
ALEX. W. CRAIK,
E. W. HURST.